(12) United States Patent
Tsai

(10) Patent No.: US 6,430,126 B1
(45) Date of Patent: Aug. 6, 2002

(54) PICK-UP HEAD CONTROLLER FOR OPTICAL DISK DRIVES

(76) Inventor: Chin-Shiong Tsai, No.32, Aly.86, Ln.40, TaWan Rd., YungKang, TaiNan (TW)

(*) Notice: Subject to any disclaimer, the term of this patent is extended or adjusted under 35 U.S.C. 154(b) by 0 days.

(21) Appl. No.: 09/564,523

(22) Filed: May 4, 2000

(51) Int. Cl.[7] ................................................. G11B 7/00

(52) U.S. Cl. .............................. 369/47.25; 369/124.01; 369/124.1

(58) Field of Search ............................ 369/47.1, 47.25, 369/47.11, 53.1, 59.1, 124.01, 124.1, 124.11, 124.12, 124.13, 44.29, 44.34, 44.35, 44.36

(56) References Cited

U.S. PATENT DOCUMENTS 5,910,743 A * 6/1999 Baskin ........................ 327/172
6,330,279 B1 * 12/2001 Belser et al. ................ 375/238

* cited by examiner

Primary Examiner—Muhammad Edun

(57) ABSTRACT

Disclosed is a pick-up head controller for optical disk drives, structured particularly for optimal actuation characteristics of a pick-up head of optical disk drives. A framework, composed of a high-frequency digital controller and a low-frequency digital controller, accomplishing different order types of controllers required by optical head systems, is provided based upon the sampling rate dependence of response of digital controllers. Experimental results shows excellent performance in optical systems that high performance, low cost and easy designing can be achieved.

17 Claims, 5 Drawing Sheets

PICK-UP HEAD CONTROLLER FOR OPTICAL DISK DRIVES

BACKGROUND OF THE INVENTION

1. Field of the Invention

This present invention generally relates to a pick-up head controller for optical disk drives, and more particularly to a framework, composed of a high-frequency digital controller and a low-frequency digital controller, accomplishing different order types of controllers required by optical head systems, so as to achieve high performance, low cost and easy designing.

2. Description of the Prior Art

Recently, due to the fast development in electro-optic technology, the related techniques of optical disk drives have grown rapidly and compatible with multimedia applications. In particular, CD-ROMs provide a great amount of data storage, and a new disc called DVD-ROM (digital video disk) provides considerably more data storage, reaching data storage capacities of up to 17 GB as compared to 680 MB for a CD-ROM. Such devices have especial usefulness in the storage of archiving data and in the storage of video data, such as full-length movies, and therefore have become the most widely used peripheral components not only in computer-based systems but also in Hi-Fi audio/video systems. At present, in the technical fields according to optical disk drives, most of the Japan-based manufacturers have filed numerous patents related to the controller framework of optical disk drives, so as to avoid violating the rights that have been claimed by the other manufacturers. The key techniques in a control system of an optical disk drive are focus control, tracking control and axis motor control. Generally, the most concerned issues of controller framework design are focused upon easy designing, high performance, and lost cost, and such is hard to achieve.

Nowadays, in order to avoid violating the rights that have been claimed by other manufacturers, most of the Japan-based manufacturers have filed numerous patents related to the controller framework of optical disk drives. Most of the efforts have been made to minimize to number of gates, so as to reduce the cost, but sacrificing the control performance of optical disk drives. Some of the frameworks are structured to be easily designed while not taking the cost into account. Such frameworks are not the best while the performance is to be taken into account. In addition, the optical head controller proposed by Toshiba only provides real roots, in lack of complex roots, of the characteristic equation for control compensation of the controller system, accordingly the compensations in gain and phase can not be improved, resulting in poor frequency response of the controller. In order to overcome the problems mentioned above, the present invention, therefore, provides a controller framework, with cost and performance taken into account.

SUMMARY OF THE INVENTION

It is the primary object of the present invention to provide a pick-up head controller for optical disk drives, structured particularly for optimal actuation characteristics of a pick-up head of optical disk drives. Experimental results shows excellent performance in optical systems that high performance, low cost and easy designing can be achieved.

Typically, the key techniques in a control system of an optical disk drive are focus control, tracking control and axis motor control. Therefore, it is another object of the present invention to provide a framework with focus control and tracking control taken into account. The basic principle of the present invention is based upon the sampling rate dependence of response of digital controllers. The controller system according to the present invention can be implemented by using two controllers, i.e., a high-frequency digital controller and a low-frequency digital controller, respectively, so as to achieve compensation in gain and phase at both high frequency and low frequency and, accordingly, a wider band for operation. In addition, the combination of said high-frequency digital controller and said low-frequency digital controller is made by using an averaging unit.

BRIEF DESCRIPTION OF THE DRAWINGS

The objects, spirits and advantages of the preferred embodiment of the present invention will be readily understood by the accompanying drawings and detailed descriptions, wherein.

DETAILED DESCRIPTION OF THE INVENTION

The present invention relates to a pick-up head controller for optical disk drives, structured particularly for optimal actuation characteristics of a pick-up head of optical disk drives. As mentioned above, the key techniques in a control system of an optical disk drive are focus control, tracking control and axis motor control. In association with FIG. 1, a configuration illustrating the components interconnected in an conventional optical disk drive is presented.

Figure 1:
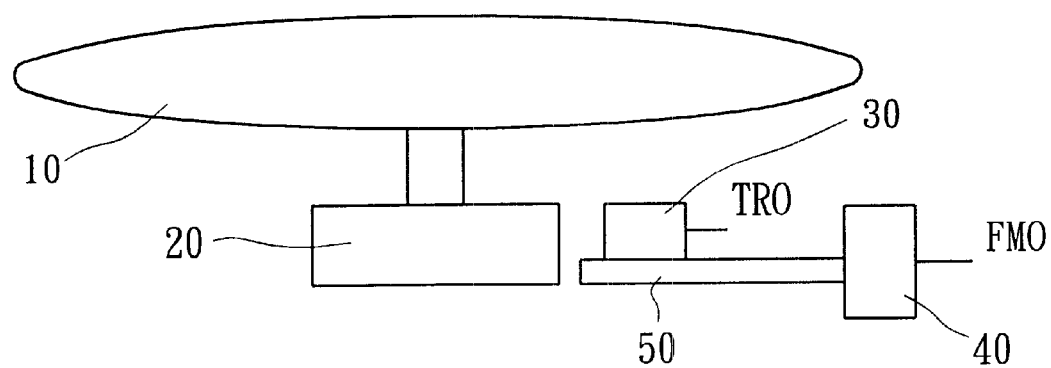
FIG. 1 is a configuration illustrating the components interconnected in an optical disk drive.

Please refer to FIG. 1, wherein the device comprises an optical disk 10 arranged on the top of an axis motor 20, which is the key component to rotate the disk 10; a pick-up head 30 arranged on a supporting means 50 and being able to moving back and forth on said supporting means 50; and a sledge motor 40 for driving said connected supporting means 50. As shown in FIG. 1, an input voltage TRO provided by said pick-up head 30 and an input voltage FMO provided by said sledge motor 40 are served as controlling signals.

On the other hand, based upon the sampling rate dependence of response of digital controllers, there is provided in the present invention a pick-up head controller for optical disk drives, including a framework, composed of a high-frequency digital controller and a low-frequency digital controller, accomplishing different order types of controllers required by optical head systems, so as to achieve compensation in gain and phase at both high frequency and low frequency and, accordingly, a wider band for operation. Please refer to FIG. 2, which is a control block diagram illustrating the components interconnected in a high-frequency controller 60 in accordance with the embodiment of the present invention, wherein said high-frequency controller 60 comprises a gain path, providing a combinational forward gain value. To be more specific, in said gain path, an input signal I/P is input into a first summing element 111, and is then output and goes through, in sequence, a first amplifier circuit 121, a second amplifier circuit 122, a third amplifier circuit 123, and a fourth amplifier circuit 124, wherein the output of said fourth amplifier circuit 124 is coupled, in sequence, to a second summing element 112 and a third summing element 113. In a preferred embodiment, the gain values of said first amplifier circuit 121, said second amplifier circuit 122, and said third amplifier circuit 123 are all 1/z, and the gain value of said fourth amplifier circuit 124 is b3.

Figure 2:
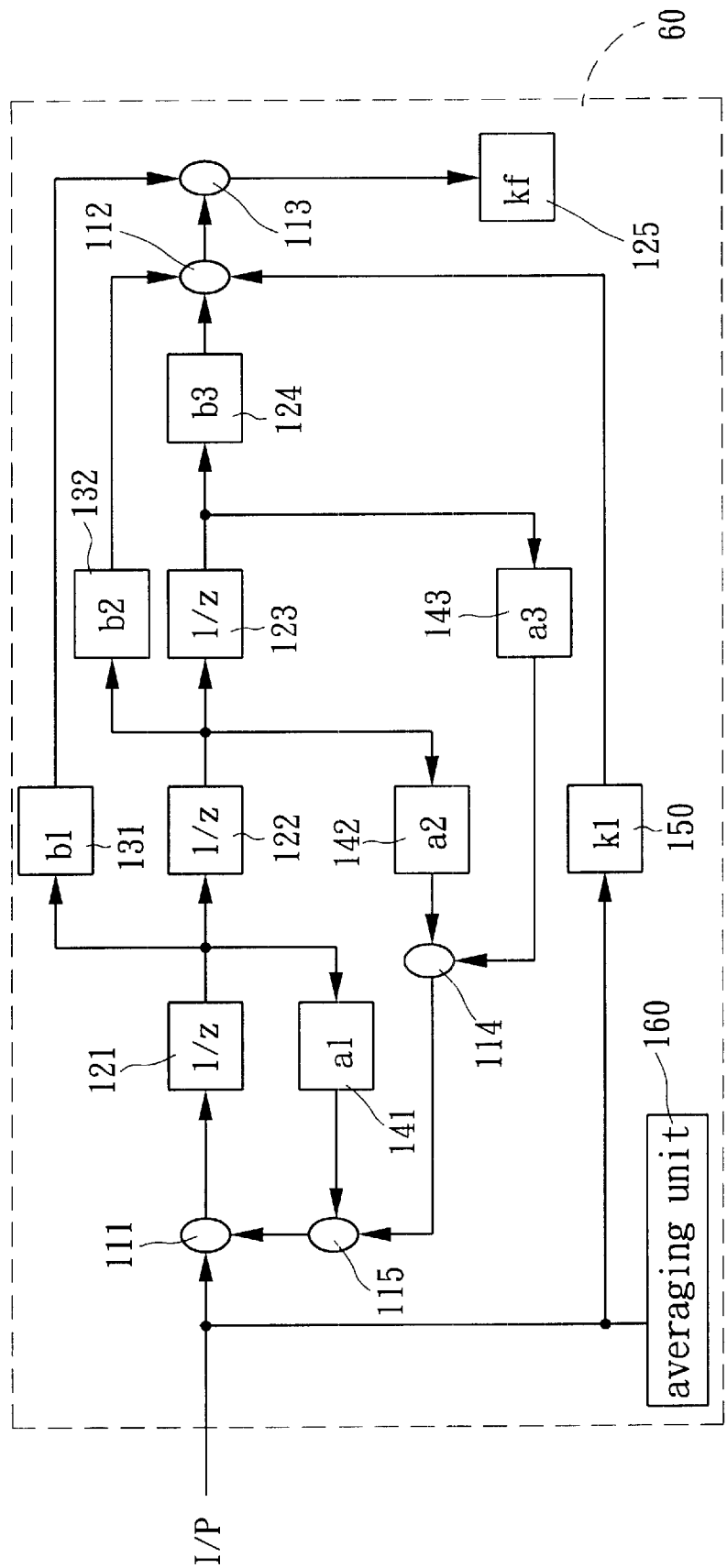
FIG. 2 is a control block diagram illustrating the components interconnected in a high-frequency controller in accordance with the embodiment of the present invention.

As shown in FIG. 2, the high-frequency controller 60 also comprises two forward gain paths, connected respectively to different amplifier circuits at one end and to different summing elements at the other end, for providing forward gain. Said forward gain paths include a first forward gain path having an amplifier circuit 131 and a second forward gain path having an amplifier circuit 132, wherein the input of said first forward gain path having an amplifier circuit 131 is coupled to the connection between said first amplifier circuit 121 and said second amplifier circuit 122 and the output of said first forward gain path having an amplifier circuit 131 is coupled to said third summing element 113, while similarly, the input of said second forward gain path having an amplifier circuit 132 is coupled to the connection between said second amplifier circuit 122 and said third amplifier circuit 123 and the output of said second forward gain path having an amplifier circuit 132 is coupled to said second summing element 112. In a preferred embodiment, the gain value of said first forward gain path having an amplifier circuit 131 is b1, and the gain value of said second forward gain path having an amplifier circuit 132 is b2.

Furthermore, as shown in FIG. 2, the high-frequency controller 60 also comprises three feedback gain paths, connected respectively to different amplifier circuits at one end and to different summing elements at the other end, for providing feedback gain. Said feedback gain paths include a first feedback gain path having an amplifier circuit 141, wherein the input is coupled to the connection between said first amplifier circuit 121 and said second amplifier circuit 122 and the output is coupled to a fifth summing element 115; a second feedback gain path having an amplifier circuit 142, wherein the input is coupled to the connection between said second amplifier circuit 122 and said third amplifier circuit 123 and the output is coupled to a fourth summing element 114; and a third feedback gain path having an amplifier circuit 143, wherein the input is coupled to the connection between said third amplifier circuit 123 and said fourth amplifier circuit 124 and the output is coupled to a fourth summing element 114. As can be seen in the drawing, said fourth summing element 114 sums the output of said second feedback gain path having an amplifier circuit 142 and the output of said third feedback gain path having an amplifier circuit 143, and then the sum is coupled to said fifth summing element 115. Similarly, said fifth summing element 115 sums the output of said first feedback gain path having an amplifier circuit 141 and the output of said fourth summing element 114, and then the sum is coupled to said first summing element 111. In a preferred embodiment, the gain value of said first feedback gain path having an amplifier circuit 141 is a a1, the gain value of said second feedback gain path having an amplifier circuit 142 is a2, and the gain value of said third feedback gain path having an amplifier circuit 143 is a3.

In addition, as shown in FIG. 2, the high-frequency controller 60 also comprises an output path having an amplifier circuit 125, connected to said third summing element 113, for providing an output gain value being kf; and an input path having an amplifier circuit 150, connected to the input signal I/P at the input and said second summing element 112 at the output, for providing an input gain value being k1. Also, as can be seen in the drawing, the high-frequency controller 60 further comprises an averaging unit 160, connected to a low-frequency controller (not shown in FIG. 2) for providing an averaged input signal. Therefore, such an approach provides compensation in gain and phase, resulting in good actuation characteristics.

Based upon the sampling rate dependence of response of digital controllers, there is provided in the present invention a pick-up head controller for optical disk drives, including a framework accomplishing different order types of controllers required by optical head systems. To be more specific, the sampling rate ranges from 85 KHz to 90 KHz. Said averaging unit 160 can average a plurality of input signals, and preferably, said averaging unit 160 can be implemented to average sixteen input signals.

Figure 3:
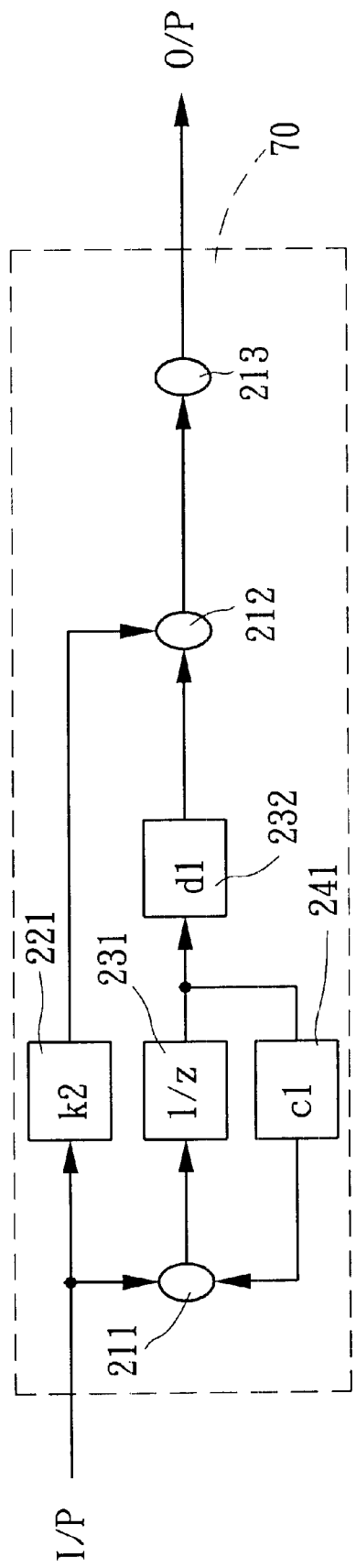
FIG. 3 is a control block diagram illustrating the components interconnected in a low-frequency controller in accordance with the embodiment of the present invention.

Please refer to FIG. 3, which is a control block diagram illustrating the components interconnected in a low-frequency controller 70 in accordance with the embodiment of the present invention, wherein said low-frequency controller 70 comprises a low-frequency gain path, providing a combinational low-frequency forward gain value. To be more specific, in said gain path, an input signal I/P is input into a first summing element 211, and is then output and goes through, in sequence, a first amplifier circuit 231, a second amplifier circuit 232, a second summing element 212, and an output summing element 213. In a preferred embodiment, the gain value of said first amplifier circuit 231 is 1/z, and gain value of said second amplifier circuit 232 is d1.

As shown in FIG. 3, the low-frequency controller 70 also comprises a forward gain path having an amplifier circuit 221, wherein the input is coupled to the connection between the input signal I/P and said first summing element 211 and the output is coupled to said second summing element 212, for providing low-frequency forward gain; and a feedback gain path having an amplifier circuit 241, wherein the input is coupled to the connection between said first amplifier circuit 231 and said second amplifier circuit 232 and the output is coupled to said first summing element 211, for providing low-frequency feedback gain. In a preferred embodiment, the gain value said forward gain path having an amplifier circuit 221 is k2, and the gain value of said feedback gain path having an amplifier circuit 241 is c1. Therefore, such an approach provides compensation in gain and phase, resulting in good actuation characteristics.

According to the low-frequency controller 70 as shown in FIG. 3, the sampling rate for controlling actuation characteristics of a pick-up head of optical disk drives ranges from 85/n KHz to 90/n KHz, wherein n denotes the number of input signals to be averaged and is preferably sixteen.

Figure 4:
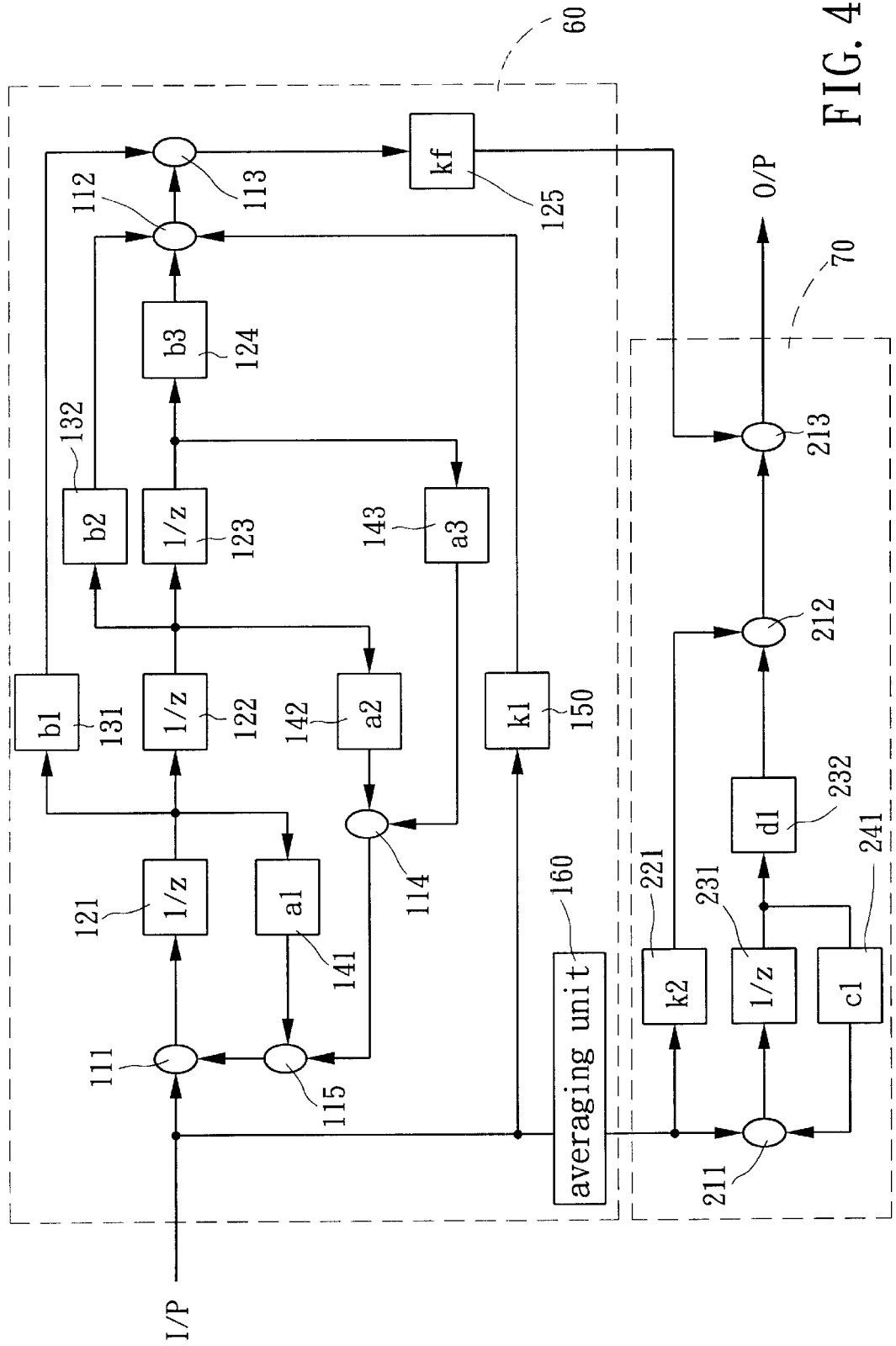
FIG. 4 is a control block diagram illustrating the combination of a high-frequency controller and a low-frequency controller in accordance with the embodiment of the present invention.

Please further refer to FIG. 4, which is a control block diagram illustrating the combination of a high-frequency controller 60 and a low-frequency controller 70 in accordance with the embodiment of the present invention, wherein its major difference from FIG. 2 and FIG. 3 is that the input signal I/P into said low-frequency controller 70 is replaced by said averaging unit 160 connected to said high-frequency controller 60 and also that the output of said output path having an amplifier circuit 125 of said high-frequency controller 60 is connected to said output summing element 213 of said low-frequency controller 70. Furthermore, according to the present invention, the combination of a high-frequency controller 60 and a low-frequency controller 70 also features said averaging 160 unit preferably implemented to average sixteen input signals also served as the connection thereof.

Figure 5:
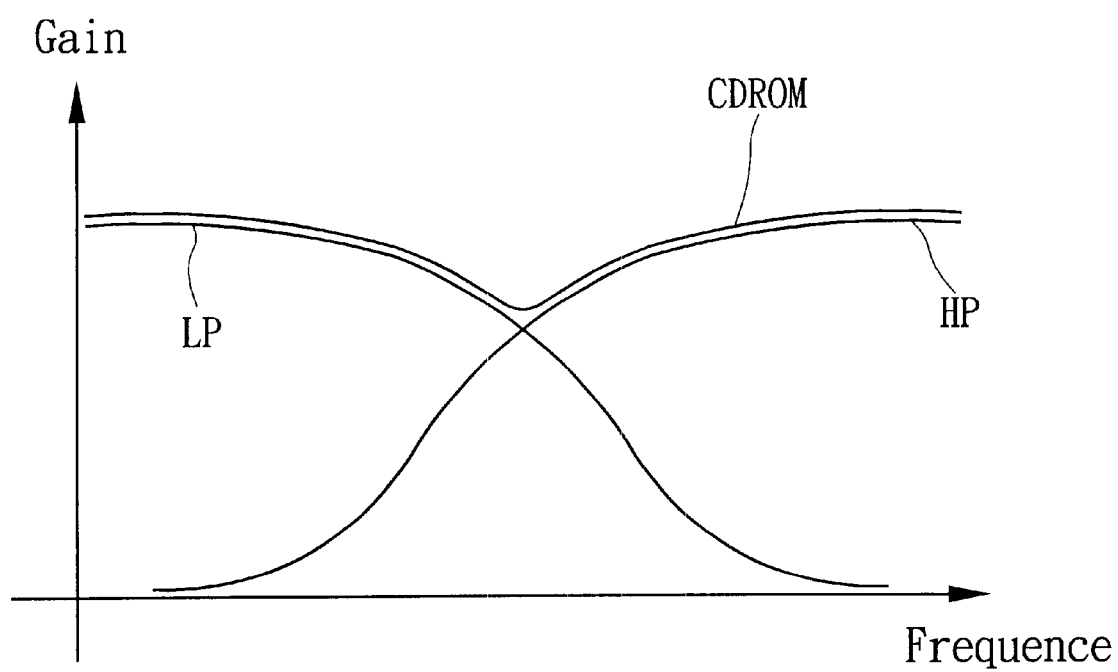
FIG. 5 shows the frequency response of the control block diagram as shown in FIG. 4.

Finally, FIG. 5 shows the frequency response of the control block diagram as shown in FIG. 4, wherein there is shown an ideal response having a slight concavity at midfrequency.

Accordingly, a pick-up head controller for optical disk drives according to the present invention is characterized in that:

1) the high-frequency controller framework designed for a pick-up head controller for optical disk drives has an order of 3;
2) the low-frequency controller framework designed for a pick-up head controller for optical disk drives has an order of 1;
3) the characteristic equation of the designed controller has complex roots, resulting in helpful phase compensation; and
4) the layout minimizes the number of required electronic components.

From our experimental results, the controller framework according to the present invention makes compensation in both gain and phase possible, and the whole framework can be implemented in a single chip, such as a pick-up module IC. Moreover, the high-frequency controller and the low-frequency controller can implemented independently, so as to be applicable to use in optical disk drives for notebook computers.

As discussed so far, in accordance with the present invention, there is provided a pick-up head controller for optical disk drives, achieving high performance, low cost and easy designing. Consequently, the present invention has been examined to be progressive and has great potential in commercial applications.

Although this invention has been disclosed and illustrated with reference to particular embodiments, the principles involved are susceptible for use in numerous other embodiments that will be apparent to persons skilled in the art. This invention is, therefore, to be limited only as indicated by the scope of the appended claims.

What is claimed is:

1. A pick-up head controller for optical disk drives, featuring a high-frequency controller, comprising:
    a gain path, for providing a combinational forward gain value, wherein an input signal is input into a first summing element, and is then output and goes through, in sequence, a first amplifier circuit, a second amplifier circuit, a third amplifier circuit, and a fourth amplifier circuit, wherein the output of said fourth amplifier circuit is coupled, in sequence, to a second summing element and a third summing element;
    two forward gain paths, connected respectively to different amplifier circuits at one end and to different summing elements at the other end, for providing forward gain;
    three feedback gain paths, connected respectively to different amplifier circuits at one end and to different summing elements at the other end, for providing feedback gain;
    an output path having an amplifier circuit, connected to said third summing element, for providing an output gain value;
    an input path having an amplifier circuit, connected to the input signal at the input and said second summing element at the output, for providing an input gain value; and
    an averaging unit, connected to an input signal at the input and a low-frequency controller at the output, for providing an averaged input signal;
    wherein such an approach provides compensation in gain and phase, resulting in good actuation characteristics.

2. The pick-up head controller for optical disk drives as recited in claim 1, wherein said forward gain paths include a first forward gain path having an amplifier circuit and a second forward gain path having an amplifier circuit, wherein:
    the input of said first forward gain path having an amplifier circuit is coupled to the connection between said first amplifier circuit and said second amplifier circuit and the output of said first forward gain path having an amplifier circuit is coupled to said third summing element; and
    the input of said second forward gain path having an amplifier circuit is coupled to the connection between said second amplifier circuit and said third amplifier circuit and the output of said second forward gain path having an amplifier circuit is coupled to said second summing element.

3. The pick-up head controller for optical disk drives as recited in claim 1, wherein said feedback gain paths include:
    a first feedback gain path having an amplifier circuit, wherein the input is coupled to the connection between said first amplifier circuit and said second amplifier circuit and the output is coupled to a fifth summing element;
    a second feedback gain path having an amplifier circuit, wherein the input is coupled to the connection between said second amplifier circuit and said third amplifier circuit and the output is coupled to a fourth summing element; and
    a third feedback gain path having an amplifier circuit, wherein the input is coupled to the connection between said third amplifier circuit and said fourth amplifier circuit and the output is coupled to a fourth summing element;
    wherein said fourth summing element sums the output of said second feedback gain path having an amplifier circuit and the output of said third feedback gain path having an amplifier circuit, and then the sum is coupled to said fifth summing element; similarly, said fifth summing element sums the output of said first feedback gain path having an amplifier circuit and the output of said fourth summing element, and then the sum is coupled to said first summing element.

4. The pick-up head controller for optical disk drives as recited in claim 1, wherein the sampling rate for controlling actuation characteristics of a pick-up head of optical disk drives ranges from 85 KHz to 90 KHz.

5. The pick-up head controller for optical disk drives as recited in claim 1, wherein said averaging unit can average a plurality of input signals.

6. The pick-up head controller for optical disk drives as recited in claim 5, wherein preferably said averaging unit 160 can be implemented to average sixteen input signals.

7. A pick-up head controller for optical disk drives, featuring a low-frequency controller, comprising:
    a low-frequency gain path, for providing a combinational low-frequency forward gain value, wherein an input signal is input into a first summing element, and is then output and goes through, in sequence, a first amplifier circuit, a second amplifier circuit, a second summing element, and an output summing element;
    a forward gain path having an amplifier circuit, wherein the input is coupled to the connection between the input signal and said first summing element and the output is coupled to said second summing element, for providing low-frequency forward gain; and and a feedback gain path having an amplifier circuit, wherein the input is coupled to the connection between said first amplifier circuit and said second amplifier circuit and the output is coupled to said first summing element, for providing low-frequency feedback gain;

wherein such an approach provides compensation in gain and phase, resulting in good actuation characteristics.

8. The pick-up head controller for optical disk drives as recited in claim 7, wherein the sampling rate for controlling actuation characteristics of a pick-up head of optical disk drives ranges from 85/n KHz to 90/n KHz.

9. The pick-up head controller for optical disk drives as recited in claim 8, wherein n denotes the number of input signals to be averaged and is preferably sixteen.

10. A pick-up head controller for optical disk drives, featuring the combination of a high-frequency controller and a low-frequency controller, wherein:

said high-frequency controller comprises:

a gain path, for providing a combinational forward gain value, wherein an input signal is input into a first summing element, and is then output and goes through, in sequence, a first amplifier circuit, a second amplifier circuit, a third amplifier circuit, and a fourth amplifier circuit, wherein the output of said fourth amplifier circuit is coupled, in sequence, to a second summing element and a third summing element;

two forward gain paths, connected respectively to different amplifier circuits at one end and to different summing elements at the other end, for providing forward gain;

three feedback gain paths, connected respectively to different amplifier circuits at one end and to different summing elements at the other end, for providing feedback gain;

an output path having an amplifier circuit, connected to said third summing element, for providing an output gain value;

an input path having an amplifier circuit, connected to the input signal at the input and said second summing element at the output, for providing an input gain value; and an averaging unit, connected to an input signal at the input and a low-frequency controller at the output, for providing an averaged input signal;

said low-frequency controller comprises:

a low-frequency gain path, for providing a combinational low-frequency forward gain value, wherein an input signal is input into a first summing element, and is then output and goes through, in sequence, a first amplifier circuit, a second amplifier circuit, a second summing element, and an output summing element;

a forward gain path having an amplifier circuit, wherein the input is coupled to the connection between the input signal and said first summing element and the output is coupled to said second summing element, for providing low-frequency forward gain; and and a feedback gain path having an amplifier circuit, wherein the input is coupled to the connection between said first amplifier circuit and said second amplifier circuit and the output is coupled to said first summing element, for providing low-frequency feedback gain;

wherein such an approach provides compensation in gain and phase, resulting in good actuation characteristics.

11. The pick-up head controller for optical disk drives as recited in claim 10, wherein said forward gain paths include a first forward gain path having an amplifier circuit and a second forward gain path having an amplifier circuit, wherein:

the input of said first forward gain path having an amplifier circuit is coupled to the connection between said first amplifier circuit and said second amplifier circuit and the output of said first forward gain path having an amplifier circuit is coupled to said third summing element; and the input of said second forward gain path having an amplifier circuit is coupled to the connection between said second amplifier circuit and said third amplifier circuit and the output of said second forward gain path having an amplifier circuit is coupled to said second summing element.

12. The pick-up head controller for optical disk drives as recited in claim 10, wherein said feedback gain paths include:

a first feedback gain path having an amplifier circuit, wherein the input is coupled to the connection between said first amplifier circuit and said second amplifier circuit and the output is coupled to a fifth summing element;

a second feedback gain path having an amplifier circuit, wherein the input is coupled to the connection between said second amplifier circuit and said third amplifier circuit and the output is coupled to a fourth summing element; and a third feedback gain path having an amplifier circuit, wherein the input is coupled to the connection between said third amplifier circuit and said fourth amplifier circuit and the output is coupled to a fourth summing element;

wherein said fourth summing element sums the output of said second feedback gain path having an amplifier circuit and the output of said third feedback gain path having an amplifier circuit, and then the sum is coupled to said fifth summing element; similarly, said fifth summing element sums the output of said first feedback gain path having an amplifier circuit and the output of said fourth summing element, and then the sum is coupled to said first summing element.

13. The pick-up head controller for optical disk drives as recited in claim 10, wherein for said low-frequency controller the sampling rate for controlling actuation characteristics of a pick-up head of optical disk drives ranges from 85 KHz to 90 KHz.

14. The pick-up head controller for optical disk drives as recited in claim 10, wherein said averaging unit can average a plurality of input signals.

15. The pick-up head controller for optical disk drives as recited in claim 14, wherein preferably said averaging unit can be implemented to average sixteen input signals.

16. The pick-up head controller for optical disk drives as recited in claim 10, wherein for said low-frequency controller the sampling rate for controlling actuation characteristics of a pick-up head of optical disk drives ranges from 85/n KHz to 90/n KHz.

17. The pick-up head controller for optical disk drives as recited in claim 16, wherein n denotes the number of input signals to be averaged and is preferably sixteen.

* * * * *